(12) United States Patent
Schneider

(10) Patent No.: US 9,754,102 B2
(45) Date of Patent: *Sep. 5, 2017

(54) MALWARE MANAGEMENT THROUGH KERNEL DETECTION DURING A BOOT SEQUENCE

(71) Applicant: Webroot Inc., Broomfield, CO (US)

(72) Inventor: Jerome L. Schneider, Boulder, CO (US)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,657

(22) Filed: Oct. 6, 2014

(65) Prior Publication Data
US 2015/0089648 A1    Mar. 26, 2015

Related U.S. Application Data

(63) Continuation of application No. 13/460,655, filed on Apr. 30, 2012, now Pat. No. 8,856,505, which is a
(Continued)

(51) Int. Cl.
*G06F 21/51* (2013.01)
*G06F 21/55* (2013.01)
*G06F 21/56* (2013.01)

(52) U.S. Cl.
CPC ............ *G06F 21/51* (2013.01); *G06F 21/554* (2013.01); *G06F 21/56* (2013.01); *G06F 21/566* (2013.01)

(58) Field of Classification Search
CPC ...................................................... G06F 21/51
(Continued)

(56) References Cited

U.S. PATENT DOCUMENTS

| 5,278,901 A | 1/1994 | Shieh et al. |
| 5,442,669 A | 8/1995 | Medin |

(Continued)

FOREIGN PATENT DOCUMENTS

| CN | 1423271 | 6/2003 |
| EP | 1315066 | 5/2003 |

(Continued)

OTHER PUBLICATIONS

Egele, "A Survey on Automated Dynamic Malware-Analysis Techniques and Tools", Apr. 2012, ACM Computing Surveys, p. 6:1-6:42.*

(Continued)

*Primary Examiner* — Taghi Arani
*Assistant Examiner* — Gregory Lane
(74) *Attorney, Agent, or Firm* — Merchant & Gould P.C.

(57) ABSTRACT

A system and method for managing pestware on a protected computer is described. The method in one variation includes monitoring events during a boot sequence of the computer; managing pestware-related events before native applications can run and after a kernel is loaded; managing pestware-related events when native applications can run; and scanning a registry of the computer for pestware when native applications can run. In variations, a pestware management engine is initialized after an operating system of the protected computer is initialized and the pestware management system both receives an event log of the monitored events and compiles the set of behavior rules utilized by kernel-level monitor.

15 Claims, 6 Drawing Sheets

Related U.S. Application Data continuation of application No. 11/462,827, filed on Aug. 7, 2006, now Pat. No. 8,190,868.

(58) Field of Classification Search
USPC .................................. 713/2, 193; 726/22, 23
See application file for complete search history.

(56) References Cited

U.S. PATENT DOCUMENTS

| | | |
|---|---|---|
| 5,485,575 A | 1/1996 | Chess et al. |
| 5,537,540 A | 7/1996 | Miller et al. |
| 5,621,889 A | 4/1997 | Lermuzeaux et al. |
| 5,623,600 A | 4/1997 | Ji et al. |
| 5,684,875 A | 11/1997 | Ellenberger |
| 5,696,822 A | 12/1997 | Nachenberg |
| 5,715,455 A | 2/1998 | Macon et al. |
| 5,765,030 A | 6/1998 | Nachenberg et al. |
| 5,796,825 A | 8/1998 | McDonnal et al. |
| 5,802,275 A | 9/1998 | Blonder |
| 5,809,138 A | 9/1998 | Netiv |
| 5,826,013 A | 10/1998 | Nachenberg |
| 5,920,696 A | 7/1999 | Brandt et al. |
| 5,930,467 A | 7/1999 | Morita |
| 5,930,828 A | 7/1999 | Jensen et al. |
| 5,951,698 A | 9/1999 | Chen et al. |
| 5,974,549 A | 10/1999 | Golan |
| 5,987,611 A | 11/1999 | Freund |
| 6,006,328 A | 12/1999 | Drake |
| 6,009,520 A | 12/1999 | Gharda |
| 6,047,319 A | 4/2000 | Olson |
| 6,069,628 A | 5/2000 | Farry et al. |
| 6,070,174 A | 5/2000 | Starek et al. |
| 6,073,241 A | 6/2000 | Rosenberg et al. |
| 6,092,194 A | 7/2000 | Touboul |
| 6,118,705 A | 9/2000 | Gupta et al. |
| 6,141,698 A | 10/2000 | Krishnan et al. |
| 6,154,844 A | 11/2000 | Touboul |
| 6,167,520 A | 12/2000 | Touboul |
| 6,173,291 B1 | 1/2001 | Jenevein |
| 6,192,512 B1 | 2/2001 | Chess |
| 6,208,999 B1 | 3/2001 | Spilo et al. |
| 6,240,530 B1 | 5/2001 | Togawa |
| 6,253,258 B1 | 6/2001 | Cohen |
| 6,272,641 B1 | 8/2001 | Ji |
| 6,310,630 B1 | 10/2001 | Kulkarni et al. |
| 6,347,375 B1 | 2/2002 | Reinert |
| 6,357,008 B1 | 3/2002 | Nachenberg |
| 6,374,363 B1 | 4/2002 | Wu et al. |
| 6,397,264 B1 | 5/2002 | Stasnick et al. |
| 6,397,311 B1 | 5/2002 | Capps |
| 6,401,210 B1 | 6/2002 | Templeton |
| 6,405,316 B1 | 6/2002 | Krishnan et al. |
| 6,412,071 B1 | 6/2002 | Hollander |
| 6,430,561 B1 | 8/2002 | Austel et al. |
| 6,457,174 B1 | 9/2002 | Kuroda et al. |
| 6,460,060 B1 | 10/2002 | Maddalozzo, Jr. et al. |
| 6,473,406 B1 | 10/2002 | Coile et al. |
| 6,480,962 B1 | 11/2002 | Touboul |
| 6,487,601 B1 | 11/2002 | Hubacher et al. |
| 6,496,913 B1 | 12/2002 | Taugher |
| 6,535,229 B1 | 3/2003 | Kraft |
| 6,535,931 B1 | 3/2003 | Celi, Jr. |
| 6,606,659 B1 | 8/2003 | Hegli et al. |
| 6,611,878 B2 | 8/2003 | De Armas et al. |
| 6,633,835 B1 | 10/2003 | Moran et al. |
| 6,667,751 B1 | 12/2003 | Wynn et al. |
| 6,681,972 B1 | 1/2004 | Tapocik |
| 6,701,441 B1 | 3/2004 | Balasubramaniam et al. |
| 6,721,721 B1 | 4/2004 | Bates et al. |
| 6,735,703 B1 | 5/2004 | Kilpatrick et al. |
| 6,772,345 B1 | 8/2004 | Shetty |
| 6,775,780 B1 | 8/2004 | Muttik |
| 6,785,732 B1 | 8/2004 | Bates et al. |
| 6,792,543 B2 | 9/2004 | Pak et al. |
| 6,804,780 B1 | 10/2004 | Touboul |
| 6,813,711 B1 | 11/2004 | Dimenstein |
| 6,829,654 B1 | 12/2004 | Jungck |
| 6,842,748 B1 | 1/2005 | Warner et al. |
| 6,851,057 B1 | 2/2005 | Nachenberg |
| 6,910,134 B1 | 6/2005 | Maher, III et al. |
| 6,931,540 B1 | 8/2005 | Edwards et al. |
| 6,959,441 B2 | 10/2005 | Moore et al. |
| 6,965,968 B1 | 11/2005 | Touboul |
| 6,971,019 B1 | 11/2005 | Nachenberg |
| 6,973,488 B1 | 12/2005 | Yavatkar et al. |
| 6,973,577 B1 | 12/2005 | Kouznetsov et al. |
| 6,973,578 B1 | 12/2005 | McIchionc |
| 6,996,706 B1 | 2/2006 | Madden et al. |
| 6,996,845 B1 | 2/2006 | Hurst et al. |
| 7,043,634 B2 | 5/2006 | Wolff et al. |
| 7,055,008 B2 | 5/2006 | Niles et al. |
| 7,058,822 B2 | 6/2006 | Edery et al. |
| 7,058,976 B1 | 6/2006 | Dark |
| 7,065,790 B1 | 6/2006 | Gryaznov |
| 7,093,239 B1 | 8/2006 | van der Made |
| 7,103,913 B2 | 9/2006 | Arnold et al. |
| 7,107,617 B2 | 9/2006 | Hursey et al. |
| 7,114,185 B2 | 9/2006 | Moore et al. |
| 7,146,429 B2 | 12/2006 | Michel |
| 7,150,045 B2 | 12/2006 | Koelle et al. |
| 7,155,742 B1 | 12/2006 | Szor |
| 7,171,690 B2 | 1/2007 | Kouznetsov |
| 7,177,937 B2 | 2/2007 | Bates et al. |
| 7,178,166 B1 | 2/2007 | Taylor et al. |
| 7,210,168 B2 | 4/2007 | Hursey et al. |
| 7,216,367 B2 | 5/2007 | Szor |
| 7,246,209 B2 | 7/2007 | Tran et al. |
| 7,257,595 B2 | 8/2007 | Verma et al. |
| 7,266,843 B2 | 9/2007 | Tarbotton et al. |
| 7,275,215 B2 | 9/2007 | Werndorfer et al. |
| 7,284,020 B2 | 10/2007 | Shitomi et al. |
| 7,284,273 B1 | 10/2007 | Szor |
| 7,287,279 B2 | 10/2007 | Bertman et al. |
| 7,302,584 B2 | 11/2007 | Tarbotton et al. |
| 7,346,611 B2 | 3/2008 | Burtscher |
| 7,380,136 B2 | 5/2008 | Zimmer et al. |
| 7,380,277 B2 | 5/2008 | Szor |
| 7,383,299 B1 | 6/2008 | Hailpern et al. |
| 7,383,581 B1 | 6/2008 | Moore et al. |
| 7,406,466 B2 | 7/2008 | Roy et al. |
| 7,423,995 B1 | 9/2008 | Elliott et al. |
| 7,461,104 B2 | 12/2008 | Nichols et al. |
| 7,467,206 B2 | 12/2008 | Moore et al. |
| 7,480,683 B2 | 1/2009 | Thomas |
| 7,483,982 B2 | 1/2009 | Hegli et al. |
| 7,484,245 B1 | 1/2009 | Friedman et al. |
| 7,484,247 B2 | 1/2009 | Rozman et al. |
| 7,490,352 B2 | 2/2009 | Kramer et al. |
| 7,493,403 B2 | 2/2009 | Shull et al. |
| 7,530,106 B1 | 5/2009 | Zaitsev et al. |
| 7,533,131 B2 | 5/2009 | Thomas |
| 7,565,695 B2 | 7/2009 | Burtscher |
| 7,590,707 B2 | 9/2009 | McCloy, III et al. |
| 7,591,016 B2 | 9/2009 | Horne |
| 7,603,440 B1 | 10/2009 | Grabowski et al. |
| 7,617,534 B1 | 11/2009 | Szor et al. |
| 7,721,333 B2 | 5/2010 | Horne |
| 7,738,373 B2 | 6/2010 | Lerner |
| 7,769,992 B2 | 8/2010 | Wang |
| 7,849,185 B1 | 12/2010 | Rockwood |
| 7,996,898 B2 | 8/2011 | Mood et al. |
| 7,996,903 B2 | 8/2011 | Sprowls |
| 8,001,582 B2 | 8/2011 | Hulten et al. |
| 8,065,514 B2 | 11/2011 | Wang |
| 8,079,032 B2 | 12/2011 | Nichols |
| 8,140,839 B2 | 3/2012 | Wang |
| 8,181,244 B2 | 5/2012 | Boney |
| 8,190,868 B2 | 5/2012 | Schneider |
| 8,201,243 B2 | 6/2012 | Boney |
| 8,312,479 B2 | 11/2012 | Boillot |
| 8,321,910 B1 | 11/2012 | English et al. |
| 8,381,296 B2 | 2/2013 | Sprowls |
| 8,387,147 B2 | 2/2013 | Sprowls |
| 8,438,386 B2 | 5/2013 | Hegli et al. |

(56) References Cited

U.S. PATENT DOCUMENTS

| | | |
|---|---|---|
| 8,452,744 B2 | 5/2013 | Nichols et al. |
| 8,635,438 B2 | 1/2014 | Wang |
| 8,667,586 B2 | 3/2014 | Boney |
| 8,856,505 B2 | 10/2014 | Schneider |
| 2001/0029511 A1 | 10/2001 | Burda |
| 2001/0044901 A1 | 11/2001 | Grawrock |
| 2001/0047451 A1 | 11/2001 | Noble |
| 2002/0052928 A1 | 5/2002 | Stern et al. |
| 2002/0078381 A1 | 6/2002 | Farley et al. |
| 2002/0083343 A1 | 6/2002 | Crosbie et al. |
| 2002/0120871 A1 | 8/2002 | Watkins et al. |
| 2002/0129277 A1 | 9/2002 | Caccavale |
| 2002/0143984 A1 | 10/2002 | Hudson Michel |
| 2002/0162015 A1 | 10/2002 | Tang |
| 2002/0162017 A1 | 10/2002 | Sorkin |
| 2002/0166059 A1 | 11/2002 | Rickey et al. |
| 2002/0166063 A1 | 11/2002 | Lachman et al. |
| 2003/0005183 A1 | 1/2003 | Burr et al. |
| 2003/0023865 A1 | 1/2003 | Cowie et al. |
| 2003/0046558 A1 | 3/2003 | Teblyashkin et al. |
| 2003/0051057 A1 | 3/2003 | Garnett et al. |
| 2003/0065926 A1 | 4/2003 | Schultz et al. |
| 2003/0065943 A1 | 4/2003 | Geis et al. |
| 2003/0074573 A1 | 4/2003 | Hursey et al. |
| 2003/0074581 A1 | 4/2003 | Hursey et al. |
| 2003/0079145 A1 | 4/2003 | Kouznetsov et al. |
| 2003/0084323 A1 | 5/2003 | Gales |
| 2003/0097409 A1 | 5/2003 | Tsai |
| 2003/0101381 A1 | 5/2003 | Mateev et al. |
| 2003/0105973 A1 | 6/2003 | Liang |
| 2003/0110391 A1 | 6/2003 | Wolff et al. |
| 2003/0115479 A1 | 6/2003 | Edwards et al. |
| 2003/0120947 A1 | 6/2003 | Moore et al. |
| 2003/0120951 A1 | 6/2003 | Gartside et al. |
| 2003/0120952 A1 | 6/2003 | Tarbotton et al. |
| 2003/0135791 A1* | 7/2003 | Natvig ............................ 714/38 |
| 2003/0154399 A1 | 8/2003 | Zuk et al. |
| 2003/0159070 A1 | 8/2003 | Mayer et al. |
| 2003/0196103 A1 | 10/2003 | Edwards et al. |
| 2003/0212902 A1 | 11/2003 | Made |
| 2003/0212906 A1 | 11/2003 | Arnold et al. |
| 2003/0217286 A1 | 11/2003 | Carmona et al. |
| 2003/0217287 A1 | 11/2003 | Kruglenko |
| 2003/0229801 A1 | 12/2003 | Kouznetsov et al. |
| 2003/0233566 A1 | 12/2003 | Kouznetsov et al. |
| 2003/0233574 A1 | 12/2003 | Kouznetsov et al. |
| 2004/0003276 A1 | 1/2004 | Kouznetsov et al. |
| 2004/0003290 A1 | 1/2004 | Malcolm |
| 2004/0010703 A1 | 1/2004 | Kouznetsov et al. |
| 2004/0015712 A1 | 1/2004 | Szor |
| 2004/0015726 A1 | 1/2004 | Szor |
| 2004/0024864 A1 | 2/2004 | Porras et al. |
| 2004/0025042 A1 | 2/2004 | Kouznetsov et al. |
| 2004/0030912 A1 | 2/2004 | Merkle et al. |
| 2004/0030914 A1 | 2/2004 | Kelley et al. |
| 2004/0034794 A1 | 2/2004 | Mayer et al. |
| 2004/0064515 A1 | 4/2004 | Hockey |
| 2004/0064736 A1 | 4/2004 | Obrecht et al. |
| 2004/0068664 A1 | 4/2004 | Nachenberg et al. |
| 2004/0080529 A1 | 4/2004 | Wojcik |
| 2004/0088570 A1 | 5/2004 | Roberts et al. |
| 2004/0122926 A1 | 6/2004 | Moore et al. |
| 2004/0133790 A1 | 7/2004 | Hensley |
| 2004/0143661 A1 | 7/2004 | Higashi et al. |
| 2004/0143763 A1 | 7/2004 | Radatti |
| 2004/0148281 A1 | 7/2004 | Bates et al. |
| 2004/0172551 A1 | 9/2004 | Fielding |
| 2004/0187023 A1 | 9/2004 | Alagna et al. |
| 2004/0199763 A1 | 10/2004 | Freund |
| 2004/0199827 A1 | 10/2004 | Muttik et al. |
| 2004/0225877 A1 | 11/2004 | Huang |
| 2004/0230530 A1 | 11/2004 | Searl et al. |
| 2004/0243829 A1 | 12/2004 | Jordan |
| 2004/0255165 A1 | 12/2004 | Szor |
| 2004/0255167 A1 | 12/2004 | Knight |
| 2004/0268315 A1 | 12/2004 | Gouriou et al. |
| 2005/0005160 A1 | 1/2005 | Bates |
| 2005/0021994 A1 | 1/2005 | Barton et al. |
| 2005/0027686 A1 | 2/2005 | Shipp |
| 2005/0033975 A1 | 2/2005 | Lahti et al. |
| 2005/0038697 A1 | 2/2005 | Aaron |
| 2005/0039029 A1 | 2/2005 | Shipp |
| 2005/0055558 A1 | 3/2005 | Carmona |
| 2005/0071624 A1 | 3/2005 | Rothman et al. |
| 2005/0071649 A1 | 3/2005 | Shipp |
| 2005/0081053 A1 | 4/2005 | Aston et al. |
| 2005/0114687 A1* | 5/2005 | Zimmer et al. ................ 713/193 |
| 2005/0120242 A1 | 6/2005 | Mayer et al. |
| 2005/0125687 A1* | 6/2005 | Townsend et al. ........... 713/200 |
| 2005/0132177 A1 | 6/2005 | Challener et al. |
| 2005/0138433 A1 | 6/2005 | Linetsky |
| 2005/0149726 A1 | 7/2005 | Joshi |
| 2005/0154885 A1 | 7/2005 | Viscomi et al. |
| 2005/0154900 A1 | 7/2005 | Muttik |
| 2005/0155031 A1 | 7/2005 | Wang et al. |
| 2005/0169282 A1 | 8/2005 | Wittman |
| 2005/0172115 A1 | 8/2005 | Bodorin |
| 2005/0172337 A1 | 8/2005 | Bodorin et al. |
| 2005/0172338 A1 | 8/2005 | Sandu et al. |
| 2005/0177868 A1 | 8/2005 | Kwan |
| 2005/0188272 A1 | 8/2005 | Bodorin et al. |
| 2005/0188423 A1 | 8/2005 | Motsinger et al. |
| 2005/0204050 A1 | 9/2005 | Turley et al. |
| 2005/0204205 A1 | 9/2005 | Ring et al. |
| 2005/0216759 A1* | 9/2005 | Rothman et al. .............. 713/200 |
| 2005/0223238 A1 | 10/2005 | Schmid et al. |
| 2005/0229250 A1 | 10/2005 | Ring et al. |
| 2005/0257266 A1 | 11/2005 | Cook et al. |
| 2005/0262558 A1 | 11/2005 | Usov |
| 2005/0262567 A1 | 11/2005 | Carmona |
| 2005/0268112 A1 | 12/2005 | Wang et al. |
| 2005/0268338 A1 | 12/2005 | Made |
| 2005/0273858 A1 | 12/2005 | Zadok et al. |
| 2005/0278783 A1 | 12/2005 | Chien et al. |
| 2005/0278785 A1 | 12/2005 | Lieberman |
| 2005/0283838 A1 | 12/2005 | Saito |
| 2006/0010485 A1 | 1/2006 | Gorman |
| 2006/0020779 A1 | 1/2006 | Rothman et al. |
| 2006/0031667 A1 | 2/2006 | Raghunandan |
| 2006/0031940 A1 | 2/2006 | Rozman et al. |
| 2006/0041942 A1 | 2/2006 | Edwards |
| 2006/0074896 A1 | 4/2006 | Thomas et al. |
| 2006/0075468 A1 | 4/2006 | Boney et al. |
| 2006/0075490 A1 | 4/2006 | Boney et al. |
| 2006/0075494 A1 | 4/2006 | Bertman et al. |
| 2006/0075501 A1 | 4/2006 | Thomas et al. |
| 2006/0080637 A1 | 4/2006 | Treit et al. |
| 2006/0085528 A1 | 4/2006 | Thomas |
| 2006/0095967 A1 | 5/2006 | Durham et al. |
| 2006/0101263 A1 | 5/2006 | Costea et al. |
| 2006/0101264 A1 | 5/2006 | Costea et al. |
| 2006/0101282 A1 | 5/2006 | Costea et al. |
| 2006/0112235 A1 | 5/2006 | Cabot |
| 2006/0123244 A1 | 6/2006 | Gheorghescu et al. |
| 2006/0129744 A1 | 6/2006 | Rothman et al. |
| 2006/0136720 A1 | 6/2006 | Armstrong et al. |
| 2006/0143703 A1 | 6/2006 | Hopen et al. |
| 2006/0150256 A1 | 7/2006 | Fanton et al. |
| 2006/0161793 A1 | 7/2006 | Orr |
| 2006/0161988 A1 | 7/2006 | Costea et al. |
| 2006/0167948 A1 | 7/2006 | Pietravalle |
| 2006/0168165 A1 | 7/2006 | Boss et al. |
| 2006/0184792 A1 | 8/2006 | Berlin |
| 2006/0200863 A1 | 9/2006 | Ray et al. |
| 2006/0218637 A1 | 9/2006 | Thomas et al. |
| 2006/0230290 A1 | 10/2006 | Burtscher |
| 2006/0230291 A1 | 10/2006 | Burtscher |
| 2006/0236069 A1 | 10/2006 | Kalach |
| 2006/0236389 A1 | 10/2006 | Horne |
| 2006/0236396 A1 | 10/2006 | Horne |
| 2006/0236397 A1 | 10/2006 | Horne |
| 2006/0253578 A1 | 11/2006 | Dixon et al. |
| 2006/0253581 A1 | 11/2006 | Dixon et al. |
| 2006/0259974 A1 | 11/2006 | Marinescu et al. |

(56) References Cited

U.S. PATENT DOCUMENTS

| | | |
|---|---|---|
| 2006/0265761 A1 | 11/2006 | Rochette |
| 2006/0272021 A1 | 11/2006 | Marinescu et al. |
| 2006/0277182 A1 | 12/2006 | Nichols et al. |
| 2006/0277183 A1 | 12/2006 | Nichols et al. |
| 2006/0288416 A1 | 12/2006 | Costea et al. |
| 2006/0294590 A1 | 12/2006 | Enstone et al. |
| 2007/0006310 A1 | 1/2007 | Piccard |
| 2007/0006311 A1 | 1/2007 | Barton et al. |
| 2007/0016914 A1 | 1/2007 | Yeap |
| 2007/0039052 A1 | 2/2007 | Chandnani |
| 2007/0050848 A1 | 3/2007 | Khalid |
| 2007/0072678 A1 | 3/2007 | Dagres |
| 2007/0074289 A1 | 3/2007 | Maddaloni |
| 2007/0078675 A1 | 4/2007 | Kaplan |
| 2007/0079379 A1 | 4/2007 | Sprosts et al. |
| 2007/0094496 A1 | 4/2007 | Burtscher |
| 2007/0094725 A1 | 4/2007 | Borders |
| 2007/0094726 A1 | 4/2007 | Wilson et al. |
| 2007/0094733 A1 | 4/2007 | Wilson et al. |
| 2007/0101431 A1 | 5/2007 | Clift |
| 2007/0130350 A1 | 6/2007 | Alperovitch et al. |
| 2007/0143843 A1 | 6/2007 | Nason et al. |
| 2007/0168285 A1 | 7/2007 | Girtakovskis et al. |
| 2007/0168694 A1 | 7/2007 | Maddaloni et al. |
| 2007/0168982 A1 | 7/2007 | Horne |
| 2007/0169191 A1 | 7/2007 | Greene et al. |
| 2007/0169197 A1 | 7/2007 | Horne |
| 2007/0169198 A1 | 7/2007 | Madddaloni et al. |
| 2007/0174911 A1 | 7/2007 | Kronenberg et al. |
| 2007/0179834 A1 | 8/2007 | Carter et al. |
| 2007/0203884 A1 | 8/2007 | Nichols et al. |
| 2007/0220043 A1 | 9/2007 | Oliver et al. |
| 2007/0226445 A1 | 9/2007 | Nichols et al. |
| 2007/0226704 A1 | 9/2007 | Nichols |
| 2007/0226800 A1 | 9/2007 | Nichols |
| 2007/0240222 A1 | 10/2007 | Tuvell et al. |
| 2007/0250817 A1 | 10/2007 | Boney |
| 2007/0261117 A1 | 11/2007 | Boney |
| 2007/0283439 A1 | 12/2007 | Ballard |
| 2008/0010326 A1 | 1/2008 | Carpenter et al. |
| 2008/0015925 A1 | 1/2008 | Sundaresan |
| 2008/0021958 A1 | 1/2008 | Foote |
| 2008/0052758 A1 | 2/2008 | Byrnes |
| 2008/0082662 A1 | 4/2008 | Dandliker et al. |
| 2008/0097936 A1 | 4/2008 | Schmidtler et al. |
| 2008/0235163 A1 | 9/2008 | Balasubramanian et al. |
| 2009/0006569 A1 | 1/2009 | Morss et al. |
| 2009/0063248 A1 | 3/2009 | Chong et al. |
| 2009/0064337 A1 | 3/2009 | Chien |
| 2009/0178125 A1 | 7/2009 | Barber et al. |
| 2009/0271428 A1 | 10/2009 | Adelman et al. |
| 2009/0287641 A1 | 11/2009 | Rahm |
| 2009/0299925 A1 | 12/2009 | Ramaswamy et al. |
| 2009/0300720 A1 | 12/2009 | Guo et al. |
| 2010/0184505 A1 | 7/2010 | Bryson et al. |
| 2011/0040825 A1 | 2/2011 | Ramzan et al. |
| 2011/0047076 A1 | 2/2011 | Carlson et al. |
| 2011/0167050 A1 | 7/2011 | Fanton et al. |
| 2011/0289587 A1 | 11/2011 | Sprowls |
| 2012/0005752 A1 | 1/2012 | Sprowls |

FOREIGN PATENT DOCUMENTS

| | | |
|---|---|---|
| JP | 2007-122692 | 5/2007 |
| WO | WO 93/25024 | 12/1993 |
| WO | WO 98/45778 | 10/1998 |
| WO | WO 02/084482 | 10/2002 |
| WO | WO 2006/039351 | 4/2006 |
| WO | WO 2006/077443 | 7/2006 |
| WO | WO2006077443 * | 7/2006 |
| WO | WO 2007/050766 | 5/2007 |
| WO | WO 2007/084947 | 7/2007 |
| WO | WO 2008/008142 | 1/2008 |

OTHER PUBLICATIONS

Gao, "Research on the working Mechanism of Bootkit", 2012, IEEE, pp. 476-479.*

Bruschi et al. (2000) IEEE 188-195 "Less Harm, Less Worry or How to Improve Network Security by Bounding System Offensiveness".

Japanese Patent Application No. 2015-101464, Office Action dated May 10, 2016, 9 pages.

Mookhey (2004) "Common Security Vulnerabilities in e-commerce Systems" Symantec 8 pages Available at: http://www.symantec.com/connect/articles/common-security-vulnerabilities-e-commerce-systems; Retrieved on Sep. 9, 2016.

K-Ways Software Technology AG (2005) "X-Ways Forensics: Integrated Computer Forensics Software" 3 pages Available from: http://web.archive.org/web/20050829195657/http://www.x-ways.net/forensics/index-m.html.

Bai et al. (2012) IET Information Security 8(2):140-151 "Approach for malware identification using dynamic behaviour and outcome triggering".

Bontchev (1992) Virus Bulletin Conference 131-141 "Possible Virus Attacks Against Integrity Programs and How to Prevent Them".

Clarke (2009) Department of Mathematics, University of London, Technical Report 178 pages "Fuzzing for Software Vulnerability Discovery".

Codeguru (2003) Three Ways to Inject Your Code into Another Process by Robert Kuster, 22 pages.

Codeguru (2004) Managing Low-Level Keyboard Hooks with the Windows API for VB Net by Paul Kimmel, 10 pages.

Codeguru (2001) Hooking the Keyboard by Anoop Thomas, 6 pages.

The Computer Guy Magazine (2011) "Virus, Malware, Oh My?" 19 pages.

Erbschole (2005) Elsevier Butterworth-Heinemann 185-189 "Trojans, Worms, and Spyware: A Computer Security Professional's Guide to Malicious Code".

European Patent Application No. 05807741.3, Search Report dated Feb. 15, 2012, 2 pages.

European Patent Application No. 05807741.3, Communication dated Apr. 27, 2012, 6 pages.

Fellows (2005) Digital Investigation 2:89-93 "The joys of complexity and the deleted file".

Great Britain Patent Application No. 1119949.4, Examination Report dated Nov. 8, 2013, 3 pages.

Great Britain Patent Application No. 1119949.4, Notification of Grant dated Jun. 17, 2014, 2 pages.

Great Britain Patent Application No. 1406624.5, First Examination Report dated Jul. 31, 2014, 8 pages.

Great Britain Patent Application No. 1406624.5, Second Examination Report dated Dec. 31, 2014, 3 pages.

Great Britain Patent Application No. 1406626.0, First Examination Report dated Jul. 31, 2014, 10 pages.

Great Britain Patent Application No. 1406626.0, Second Examination Report dated Dec. 31, 2014, 4 pages.

Great Britain Patent Application No. 1406624.5, Notification of Grant dated Jan. 27, 2015, 2 pages.

Great Britain Patent Application No. 1406626.0, Notification of Grant dated Jan. 27, 2015, 2 pages.

Harley, et al. (2001) Osborne/McGraw-Hill 219-229 "Viruses Revealed".

Hruska (1997) European Conference on Security and Detection 128-131 "Virus Detection".

International Search Report from Application No. PCT/US05/34874, dated Jul. 5, 2006, 14 pages.

International Search Report from Application No. PCT/US05/34873, dated Jun. 12, 2008, 2 pages.

International Search Report and Written Opinion from Application No. PCT/US2006/008882, dated Oct. 19, 2007, 5 pages.

International Search Report from Application No. PCT/US2006/008883, dated Oct. 19, 2007, 5 pages.

International Search Report and Written Opinion from Application No. PCT/US2006/014003, dated Jul. 17, 2007, 6 pages.

(56) References Cited

OTHER PUBLICATIONS

International Search Report and Written Opinion from Application No. PCT/US2006/014004, dated Jan. 22, 2007, 4 pages.
International Search Report and Written Opinion from Application No. PCT/US2006/014405, dated Nov. 29, 2007, 5 pages.
International Search Report from Application No. PCT/US2006/025378, dated Sep. 18, 2007, 10 pages.
International Search Report from Application No. PCT/US2006/041798, dated Dec. 4, 2007, 8 pages.
International Search Report and Written Opinion, Application No. PCT/US2006/041799, dated Oct. 14, 2008, 5 pages.
International Search Report and Written Opinion from Application No. PCT/US2007/062947, dated Jun. 29, 2007, 8 pages.
International Search Report and Written Opinion from Application No. PCT/US2007/064487, dated Nov. 30, 2007, 8 pages.
International Search Report and Written Opinion from Application No. PCT/US2007/064488, dated Sep. 9, 2007, 9 pages.
International Search Report from Application No. PCT/US2007/064489 dated Sep. 27, 2007, 8 pages.
International Search Report from Application No. PCT/US2007/064490, dated Jul. 23, 2007, 10 pages.
International Search Report from Application No. PCT/US2007/067076, dated Nov. 2, 2007, 10 pages.
International Search Report from Application No. PCT/US2007/067078, dated Nov. 2, 2007, 9 pages.
International Search Report from Application No. PCT/US2007/067082, dated Nov. 5, 2007, 8 pages.
International Search Report from Application No. PCT/US2007/067084, dated Nov. 5, 2007, 11 pages.
International Search Report from Application No. PCT/US2010/025702, dated Sep. 17, 2010, 4 pages.
Japanese Patent Application No. 2012-507228, Office Action dated Feb. 21, 2014, 3 pages (English Translation).
Japanese Patent Application No. 2012-507228, Decision of Rejection dated Jan. 20, 2015, 3pages (English Translation).
Jebara (2004) 21st International Conference on Machine Learning Banff, Canada "Multi-Task Feature and Kernel Selection for SVMs" Online—Availabe at: http://www.cs.columbia.edu/~jebara/papers/metalearn.pdf.
Julisch, et al. (2005) DIMVA Second International Conference Jul. 7-8 Vienna, Austria "Detection of Intrusions and Malware, and Vulnerability Assessment".
Kan, et al. (Aug. 2005) NUS School of Computing "Fast webpage classification using URL features" [online] Available from: http://www.comp.nus.edu.sg/~kanmy/papers/nustrc8_05.pdf (Accessed on Jan. 28, 2015).
Kim (2004) "Intercepting System API Calls" 6 pages Available at: https://software.intel.com/en-us/articles/intercepting-system-api-calls.
Lin, et al. (2003) Database EPODOC "Method and System for Computing Fragment Rate of Magnetic Disc" XP002451265 Abstract Only.
Lin, et al. (2003) Database EPODOC "Method and System for Computing Fragment Rate of Disc" XP002451266 Abstract Only.
Linn, et al. (2003) "Obfuscation of Executable Code to Improve Resistance to Static Disassembly" ACM 290-299.
Marsh (1993) "Win32 Hooks" 15 pages Available at: http://msdn.microsoft.com/library/en-us/dnwui/html/msdn_hooks32.asp/?frame=true.
Microsoft (2005) "How to Subclass a Window in Windows 95" 2 pages Available at: http://support.microsoft.com/kb/q125680/.

Microsoft SysInternals (2006) "Rootkit Revealer 1.71" Online Available at: http://filehippo.com/download_rootkit_revealer/ Accessed on: Nov. 17, 2015.
Mikhaliov (2005) "NTFS file system" 8 pages Available at: http://www.digit-life.com/articles/ntfs/ Accessed on Jun. 18, 2007.
Milenković, et al. (2005) ACM SIGARCH Computer Architecture News 33(1):108-117 "Using Instruction Block Signatures to Counter Code Injection Attacks".
Nachenberg (1997) Communications of the ACM 40(1):46-51 "Computer Virus-Coevolution: The battle to conquer computer viruses is far from won, but new and improved antidotes are controlling the field.".
Nguyen, et al. (Dec. 2006) Proceedings of the 6th International Conference on Internet Information Retrieval, Korea 143-149 "A Maximum Entropy Model for Text Classification" Available from: http://www.uet.vnu.edu.vn/~thuyhq/papers/06_NNH_International%20Conference%20on%20Internet%20Information%20Retrieval_IRC2006_143_149.pdf (Accessed on Jan. 28, 2015).
OSDir.com (2004) "ntfsprogs-todo [LONG]" Online Available at: http://osdir.com/ml/linux.file-systems.ntfs.devel/2004-08/msg00023.html; Retrieved on Nov. 13, 2015.
Rabek, et al. (2003) ACM 76-82 "Detection of Injected, Dynamically Generated, and Obfuscated Malicious Code".
Roelker (2004) Sourcefire, Inc. "HTTP IDS Evasions Revisited" Online: Availabe at: https://s3.amazonaws.com/snort-org-site/production/document_files/files/000/000/031/original/sf_HTTP_IDS_evasions.pdf?AWSAccessKeyId=AKIAIXACIED2SPMSC7GA&Expires=1447872643&Signature=GITFKHYyb1mABkFA09oXzegOEkY%3D; Retrieved on Nov. 18, 2015.
Salomon (2010) Undergraduate Topics in Computer Science "Elements of Computer Society" 19 pages.
Singh, et al. (2002) ACM SIGPLAN Notices 37(2): 29-35 "Analysis and Detection of Computer Viruses and Worms: An Annotated Bibliography".
Skoudis (2004) Malware: Fighting Malicious Code 590-618 "Chapter 11: Malware Analysis".
Su, et al. (2006) POPL 372-382 "The Essence of Command Injection Attacks in Web Applications".
Techterms "Vector" Nov. 7, 2007 [Online] Downloaded Feb. 18, 2015 http://techterms.com/definition/vector.
Techterms-2 "URI" Nov. 1, 2007 [Online] Downloaded Feb. 18, 2015 http://techterms.com/definition/uri.
Tittel (2005) PC Magazine 328-335 "Fighting Spyware, Viruses, and Malware".
Unknown Author (2006) Illusive Society "Wolves in Sheep's Clothing: Malicious DLLs Injected into Trusted Host Applications" 13 pages Available from: http://home.arcor.de/scheinsicherheit/dll.htm.
Wang et al. (2005) IEEE, International Conference on Dependable Systems "Detecting Stealth Software with Strider GhostBuster" 10 pages.
Wen et al. (2008) IEEE, International Conference on Information Security and Assurance 150-155 "Implicit Detection of Hidden Processes with a Local-Booted Virtual Machine".
Whittaker, et al. (2002) ACM 242-246 "Neutralizing Windows-Based Malicious Mobile Code".
Yurcik et al. (2001) IEEE IT Pro 41-44 "A Planning Framework for Implementing Virtual Private Networks".
Japanese Patent Application No. 2015-101464, Notice of Allowance dated Jan. 17, 2017, 4 pages.

* cited by examiner

MALWARE MANAGEMENT THROUGH KERNEL DETECTION DURING A BOOT SEQUENCE

PRIORITY

This application is a continuation of U.S. Pat. No. 8,856,505, filed Apr. 30, 2012, and entitled "Malware Management Through Kernel Detection During a Boot Sequence," which application is a continuation of U.S. Pat. No. 8,190,868, filed Aug. 7, 2006, and entitled "Malware Management Through Kernel Detection," each of which are incorporated herein by reference in their entireties.

RELATED APPLICATIONS

This application is also related to U.S. patent application Ser. No. 10/956,578, entitled "System and Method for Monitoring Network Communications For Pestware," and U.S. patent application Ser. No. 11/237,291, entitled "Client Side Exploit Tracking," each of which are incorporated herein by reference in their entireties.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

The design and implementation of current and future pestware incorporates techniques that make the pestware difficult to identify, remove, or even to detect. These techniques, and likely future improvements to them, rely on patches, hooks and yet-to-be-discovered methods for modifying the behavior of a computer operating system itself. Such techniques render current detection tools ineffective by intercepting and altering the results of operating system queries from the tools that must rely on the dependability of operating system calls to return lists of running programs, file system and registry contents, for example.

Detection of pestware that uses these cloaking techniques is often ineffective by the real-time shields that existing anti-pestware applications utilize because these real-time shields begin execution after pestware has been able to execute and modify the operating system. FIG. 3, for example, illustrates the boot and operating system sequences that demonstrate the inability of user-mode services or applications to detect and prevent pestware (e.g., a Rootkit) that loads before them in a boot sequence. Periodic scanning for pestware is particularly ineffective because it leaves a window of time between scans in which pestware can execute and cloak itself. Accordingly, current software is not always able to identify and remove pestware in a convenient manner and will most certainly not be satisfactory in the future.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the invention may be characterized as a method for managing pestware on a computer. The method in this embodiment includes monitoring events during a boot sequence of the computer; managing pestware-related events during a first period in a boot sequence of the computer, the first period in the boot sequence occurring before the computer becomes configured to run native applications, before a subsystem of an operating system is loaded, and after a kernel is loaded; managing pestware-related events in accordance with a set of behavior rules during a second period in the boot sequence occurring when the computer is configured to run native applications; and scanning a registry of the computer for pestware during the second period in the boot sequence.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
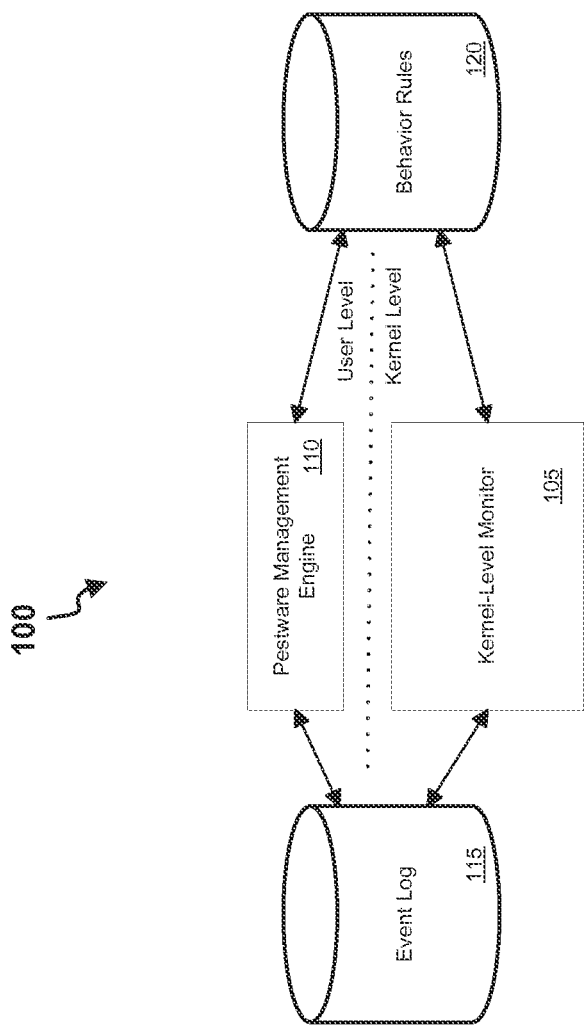
FIG. 1 is a block diagram depicting a pestware management system in accordance with an exemplary embodiment of the present invention.

Referring now to the drawings, where like or similar elements are designated with identical reference numerals throughout the several views, and referring in particular to FIG. 1, it illustrates a block diagram 100 of one implementation of the present invention. This implementation includes four components: a kernel-level monitor 105, a pestware management engine 110, event storage 115 and behavior rule storage 120.

The kernel-level monitor 105 and a pestware management engine 110 can be implemented in software or hardware. And if implemented in software, the modules can be designed to operate on any type of computer system including WINDOWS and Linux-based systems Additionally, the software can be configured to operate on personal computers and/or servers. For convenience, embodiments of the present invention are generally described herein with relation to WINDOWS-based systems. Those of skill in the art can easily adapt these implementations for other types of operating systems or computer systems.

The event storage 115 and behavior rule storage 120 may be realized by a single magnetic hard drive, distributed hard drives or non-volatile memory. In some variations, the event storage 115 may be implemented with volatile memory.

Referring first to the kernel-level monitor 105, in the exemplary embodiment it is responsible for detecting pestware or pestware activity on a protected computer or system. (The term "protected computer" is used to refer to any type of computer system, including personal computers, handheld computers, servers, firewalls, etc.) In several embodiments, the kernel-level monitor 105 begins execution early in the boot and operating system loading process on the protected computer, and as discussed further herein, the kernel-level monitor 105 obtains (e.g., in a secure manner), a most recent set of behavior rules from the behavior rules storage 120 that was previously compiled by the pestware management engine 110.

The kernel-level monitor 105 additionally uses several techniques that allow it to intercept and monitor various operating system behaviors, including attempts by pestware to modify the behavior of the operating system through the use of patches and hooks or by invoking other mechanisms that could be used to alter information passed to or from the operating system.

Moreover, the kernel-level monitor 105 in the exemplary embodiment also provides mechanisms that can prevent, disable or disallow attempts by pestware to use or create patches, hooks and other methods required for intercepting or altering operating system information. In addition, the kernel-level monitor 105 identifies specific attempts by other software by locating the specific instance within the set of behavior rules 120 generated by the pestware management engine 110.

Beneficially, the kernel-level monitor 105 in the exemplary embodiment also constructs and stores an event log in the event storage 115 that contains details for each of the intercepted and monitored events detected so that after the pestware management engine 110 executes, it acquires the event log from the event storage module 115.

The pestware management engine 110 in the present embodiment identifies, by examining the event log created by the kernel-level monitor 105, instances of known pestware, suspicious events by unknown software, and other patterns of events that may be useful in identifying pestware.

In addition, the pestware management engine 110 can add to or modify the common set of behavior rules that are utilized by kernel-level monitor 105 the next time the kernel-level monitor 105 loads and executes. In this way, the pestware management engine 110 is able to provide updated information about pestware-related events that should be prevented by the kernel-level monitor 105 during future boot operations on the protected computer.

Advantageously the ability to first observe, using the kernel-level monitor 105, events associated with the loading, execution and behaviors of pestware, followed by the pestware management engines's 110 incorporation of the events into the behavior rules 120 allows, in subsequent boot operations, the kernel-level monitor 105 to prevent or deny the events from happening. Moreover, the pestware management module 110 may receive updated information about events that should be prevented from a remote host (not shown). The above-identified application entitled Client-side Exploit Tracking includes details about developing behavior rules at a centralized host location that may be pushed out to protected computers.

Figure 2:
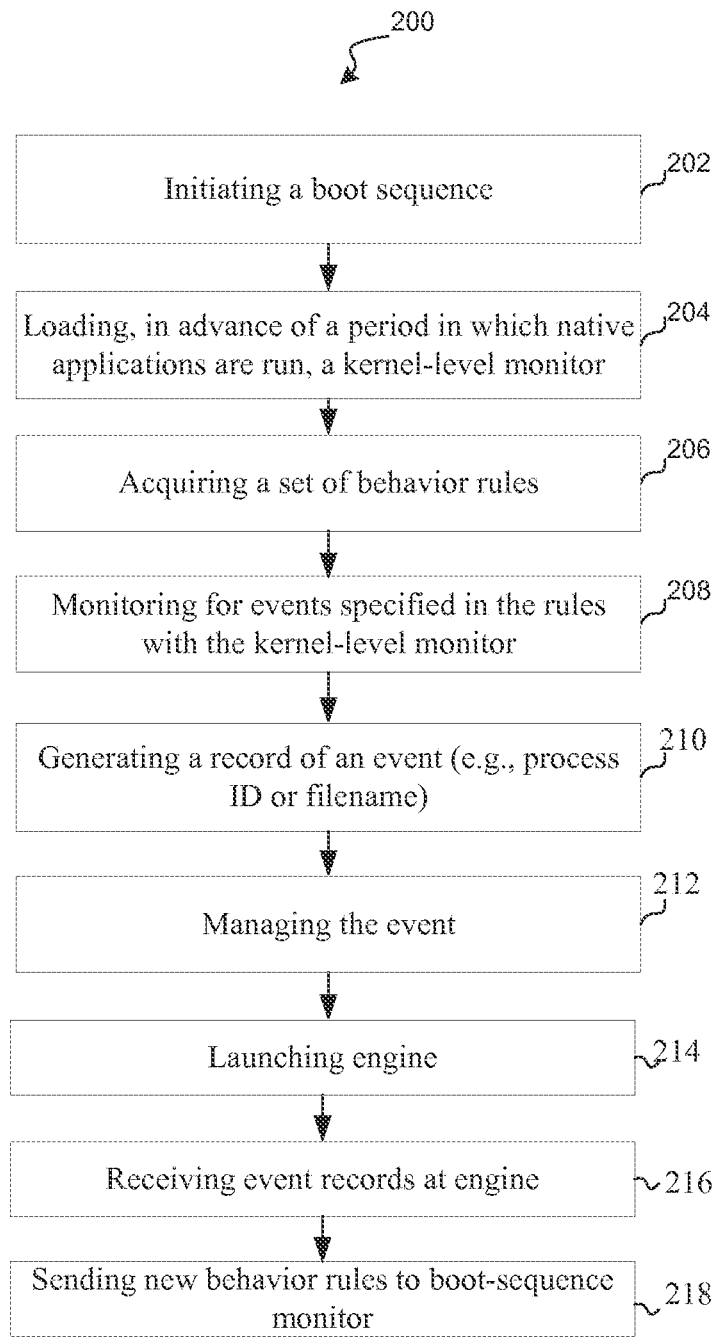
FIG. 2 is a flowchart depicting steps carried out in accordance with an exemplary embodiment of the present invention.
Figure 3:
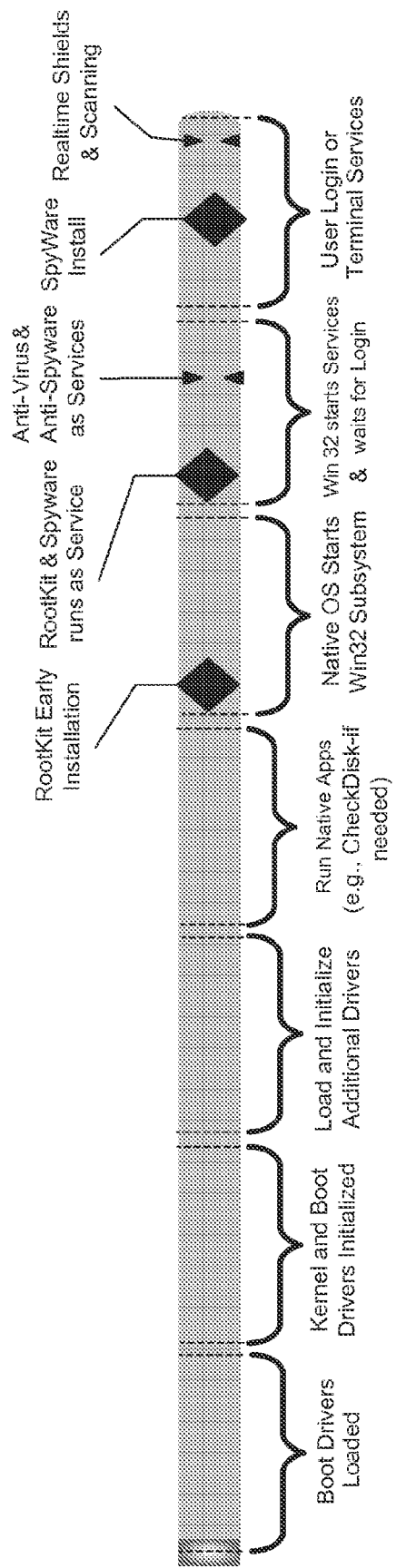
FIG. 3 is a timing diagram depicting a boot sequence in accordance with prior art pestware management techniques.

Referring next to FIG. 2, it is a flowchart of one method for managing pestware. In this method, a boot sequence of the protected computer is initiated (e.g., by a user of the protected computer) (Block 202), and in advance of a period when native applications (e.g., checkdisk) of the protected computer beginning execution, the kernel-level monitor 105 is initialized (Block 204).

In several embodiments, for example, the kernel-level monitor 105 is loaded with boot drivers and initialized before at least some of the boot drivers. In some embodiments, the kernel-level monitor 105 is initialized before any of the boot drivers so as to be capable of monitoring the initialization of the boot drivers. In one embodiment, for example, a low tag number (e.g., the lowest tag number) is associated with the kernel-level monitor 105 so that the kernel-level monitor 105 is initialized before boot drivers, with higher tag numbers, are initialized. It is contemplated that once the kernel-level monitor 105 is provided with a low tag number, registry keys of the protected computer may be protected so as to prevent pestware from subsequently altering the tag order.

In yet another embodiment, a tag number of zero is associated with the kernel-level monitor 105 and the operating system of the protected computer is altered so as to allow a tag number of zero to be initialized first, before any boot drivers are initiated.

Figure 4:
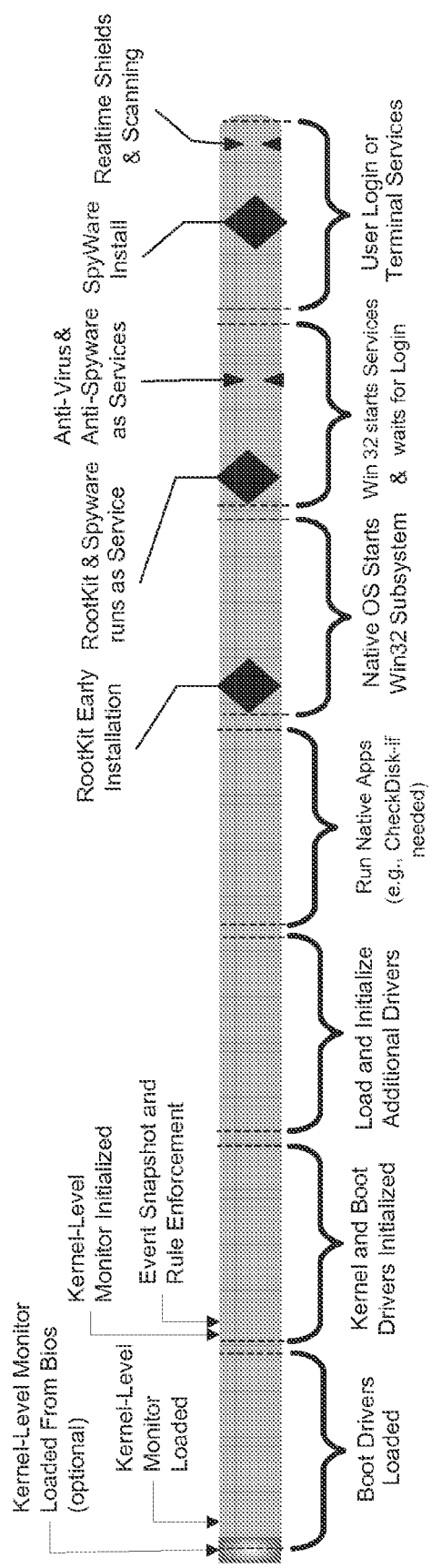
FIG. 4 is a timing diagram depicting a boot sequence in accordance with pestware management techniques of several embodiments of the present invention.

Referring briefly to FIG. 4, which depicts an exemplary boot and operating system load sequence, the kernel-level monitor 105 in the exemplary embodiment is initialized before a period when native applications may be run. More specifically, as depicted in FIG. 4, the kernel-level monitor 105 is loaded in the boot sequence when boot drivers are loaded and initialized at a very early (e.g., first) stage during the period in which the boot drivers are initialized. As depicted in FIG. 4, in an alternative embodiment, the kernel-level monitor 105 is loaded from a BIOS of the protected computer.

In many embodiments of the invention, the kernel-level monitor 105 is realized by a Windows device driver that can operate in the constraints imposed on the boot drivers, which are needed to operate peripherals (e.g., keyboard, mouse, monitor, hard drive, etc.) during the initial boot process.

During the time when the kernel-level monitor 105 is loaded and initialized, driver hooks and monitoring mechanisms that are utilized by the kernel-level monitor 105 are placed into the operating system kernel. Referring again to FIG. 4, this time period includes the time period depicted as "Event Snapshot and Rule Enforcement." In the exemplary boot sequence depicted in FIG. 4, the kernel-level monitor 105 monitors events on an ongoing basis after being initialized early during the period in which the boot drivers are loaded.

Referring again to FIG. 2, when the kernel-level monitor 105 begins execution, it acquires the most recent set of behavior rules (e.g., in a secure manner) from behavior rule storage 120 (Block 206) and begins monitoring for the events specified in the rules (Block 208). When a monitored event is detected, details of the event (e.g., ProcessID and/or filename) are added to an event record (Block 210) that is added to event storage 115, which may be either an in-memory or a file-based log of events.

As shown in FIG. 2, the kernel-level monitor 105 then manages the protected computer in response to the event in accordance with the behavior rules (Block 212). For example, if a detected event is marked for denial or deletion in the behavior rules, the kernel-level monitor 105 either prevents the operating system from receiving the request or it forces the operating system to reject the request.

In the exemplary embodiment, as the boot sequence continues, the kernel-level monitor 105 continues to run independently, collecting event log data (e.g., during the periods in which additional drivers are initialized and when native applications are capable of executing). As depicted in FIG. 4, as the boot sequence progresses, it is possible that a rootkit or another variety of pestware loads as a driver or service. In the context of a Windows operating system, for example, during the period that the native operating system starts the Win32 subsystem, it is possible that a rootkit or other pestware may toad as a driver or service. Events that are generated by such a pestware driver or service are monitored by the kernel-level monitor 105, added to the event log, and if the behavior rules include specific instance data indicating the event is a pestware-related event, the kernel-level monitor 105 denies or disables the rootkit's attempts to install.

As shown in FIG. 4, in a Windows-based system, as Win32 starts global services, the kernel-level monitor 105 again monitors and possibly prevents spyware and rootkits from installing. Also during this period, the pestware management engine 110 is started as a service (Block 214).

In several embodiments, one of the tasks of the pestware management engine 110 is to communicate securely with the kernel-level monitor 105 so as to retrieve the event logs for examination and analysis (Block 216). In several embodiments, the event logs are compared against factors known o be associated with pestware so as to identify a likelihood that the events in the event log are pestware related events. In addition, the event tog may be sent to a centralized host, which collects information about activities at protected computers and generates weighted factors which are pushed out to the protected computers and utilized to help identify pestware at the protected computer. The above-identified application entitled Client Side Exploit Tracking includes details of techniques that may be used to identify pestware-related events from the event logs.

In the exemplary embodiment, after the pestware management engine 110 is launched, it continues to communicate with the kernel-level monitor 105 so as to receive new events that are detected by the kernel-level monitor 105 and to send new behavior rules to the kernel-level monitor 105 as they are developed. If the pestware management engine 110 should cease execution, the kernel-level monitor 105 can continue to collect event logs and protect against those events covered by the current behavior rules until the pestware management engine 110 restarts and communicates once again with the kernel-level monitor 105.

Figure 5:
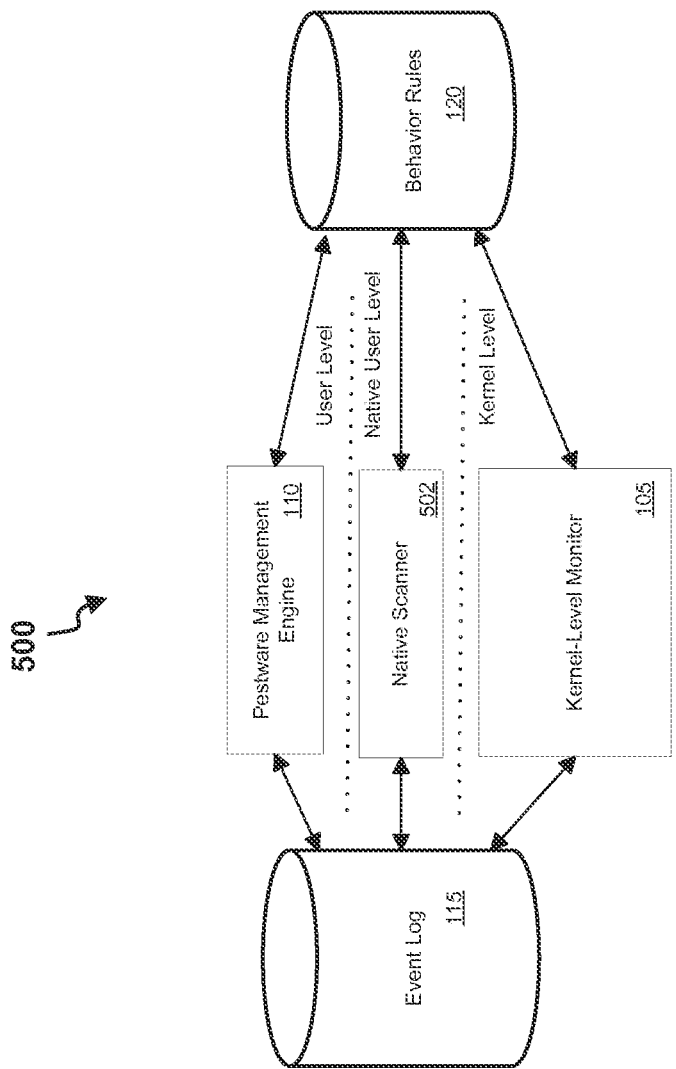
FIG. 5 is a block diagram of a pestware management system in accordance with another embodiment of the present invention.
Figure 6:
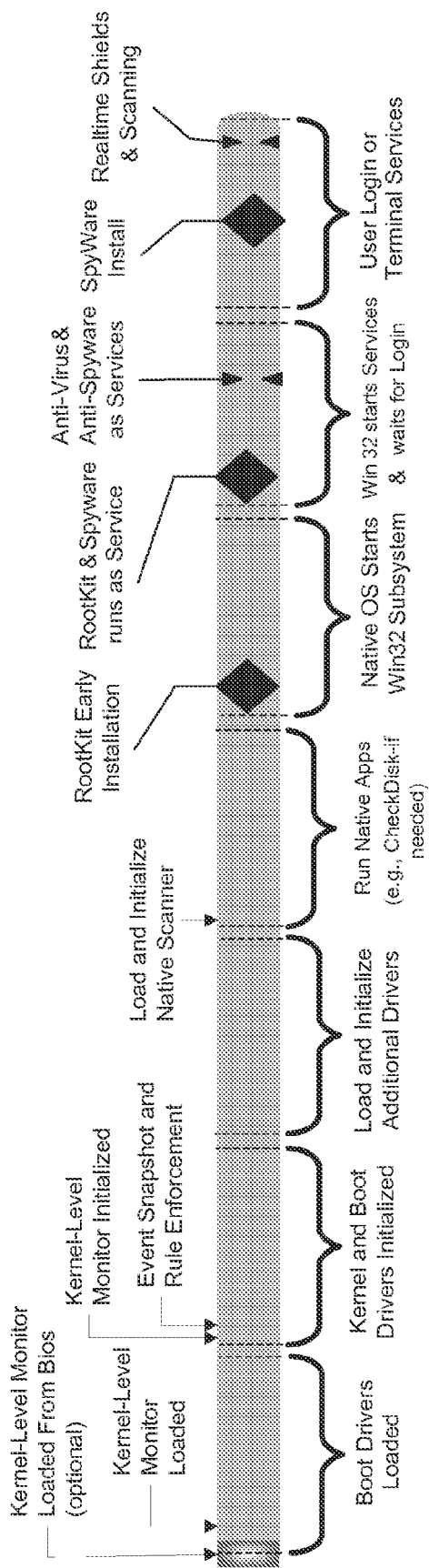
FIG. 6 is a timing diagram depicting another boot sequence in accordance with another embodiment of the present invention.

Referring next to FIG. 5, shown a block diagram 500 of another implementation of the present invention. In this embodiment, a native scanner 502 is shown operating at a native user level of the protected computer. In several embodiments, the native scanner 502 is initialized early during the period of the boot sequence during which native applications may be run. In the embodiment depicted in FIG. 5, for example, the native scanner 502 is the first non-kernel application to initialize so as to be capable of monitoring the protected computer before any other native applications are initialized.

In operation, the native scanner 502 is configured to examine registry, filesystem and other portions of a protected computer before the Win32 subsystem and most services are loaded and executed. In this way, additional information is generated that the pestware management engine 110 can later examine and utilize in order to generate new behavior rules for the kernel-level monitor 105.

In some embodiments, the native scanner 502 may be enabled with pestware management functions such as memory and file scanning. The above-identified application entitled: System and Method for Monitoring Network Communications includes details of many pestware management functions that may be incorporated into the native scanner 502.

In conclusion, the present invention provides, among other things, a system and method for managing pestware during a boot sequence of a protected computer. It should be recognized, however, that embodiments of the present invention certainly have applications that extend beyond the boot sequence period of operation when the protected computer is operating in a user mode. Moreover, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A device-comprising:
   at least one processor; and
   a memory encoding computer executable instructions that, when executed by the at least one processor, perform a method comprising:
   monitoring events during a boot sequence of the computer; managing pestware-related events during a first period in a boot sequence of the computer, the first period in the boot sequence occurring before the computer becomes configured to run native applications, before a subsystem of an operating system is loaded, and after a kernel is loaded;
   managing pestware-related events in accordance with a set of behavior rules during a second period in the boot sequence occurring when the computer is configured to run native applications;
   generating, in response to the monitoring, a record of events, the record of events including the pestware-related events;
   analyzing the record of events so as to identify the pestware-related events; modifying the set of behavior rules so as to prevent the pestware related events; and
   scanning a registry of the computer for pestware during the second period in the boot sequence.

2. The device of claim 1, wherein the method further comprises launching, after an operating system is initiated, a pestware management engine; and wherein the set of behavior rules includes behavior rules compiled by the pestware management engine.

3. The device of claim 1, wherein the record of events includes information selected from the group consisting of: process identification information, file identification information, and hook generation information.

4. The device of claim 1, wherein the method further comprises managing pestware-related events after the computer becomes configured to run native applications.

5. The device of claim 1, wherein the monitoring includes monitoring the boot sequence while boot drivers are initiated.

6. A system for managing pestware on a computer comprising:
at least one processor;
a memory encoding computer executable instructions that, when executed by the at least one processor, perform a method comprising:
monitoring events during a boot sequence of the computer;
managing pestware-related events during first period in a boot sequence of the computer, the first period in the boot sequence occurring before the computer becomes configured to run native applications, before a subsystem is loaded, and after a kernel is loaded;
managing pestware-related events in accordance with a set of behavior rules during a second period in the boot sequence occurring when the computer is configured to run native applications;
generating, in response to the monitoring, a record of events, the record of events including the pestware-related events;
analyzing the record of events so as to identify the pestware-related events; and
modifying the set of behavior rules so as to prevent the pestware related events; and
scanning a registry of the computer for pestware during the second period in the boot sequence.

7. The system of claim 6, wherein the method further comprises launching, after an operating system is initiated, a pestware management engine; and wherein the set of behavior rules includes behavior rules compiled by the pestware management engine.

8. The system of claim 6, wherein the record of events includes information selected from the group consisting of: process identification information, file identification information, and hook generation information.

9. The system of claim 6, wherein the method further comprises
managing pestware-related events after the computer becomes configured to run native applications.

10. The system of claim 6, wherein the method further comprises monitoring the boot sequence while boot drivers are initiated.

11. A hard drive comprising computer executable instructions that, when executed by at least one processor, perform a method comprising:
monitoring events during a boot sequence of a computer;
managing pestware-related events during a first period in a boot sequence of the computer, the first period in the boot sequence occurring before the computer becomes configured to run native applications, before a subsystem is loaded, and after a kernel is loaded;
managing pestware-related events in accordance with a set of behavior rules during a second period in the boot sequence occurring when the computer is configured to run native applications;
generating, in response to the monitoring, a record of events, the record of events including the pestware-related events;
analyzing the record of events so as to identify the pestware-related events; and
modifying the set of behavior rules so as to prevent the pestware related events; and
scanning a registry of the computer for pestware during the second period in the boot sequence.

12. The hard drive of claim 11 further comprising program instructions for launching, after an operating system is initiated, a pestware management engine; and
wherein the set of behavior rules includes behavior rules compiled by the pestware management engine.

13. The hard drive of claim 11, wherein the record of events includes information selected from the group consisting of: process identification information, file identification information, and hook generation information.

14. The hard drive of claim 11 further comprising program instructions for:
managing pestware-related events after the computer becomes configured to run native applications.

15. The hard drive of claim 11, wherein the monitoring includes monitoring the boot sequence while boot drivers are initiated.

* * * * *